United States Patent [19]

Miyamoto

[11] Patent Number: 4,842,900
[45] Date of Patent: Jun. 27, 1989

[54] METHOD AND APPARATUS FOR COATING

[75] Inventor: Kimiaki Miyamoto, Kanagawa, Japan

[73] Assignee: Fuji Photo Film Co., Ltd., Kanagawa, Japan

[21] Appl. No.: 13,805

[22] Filed: Feb. 12, 1987

[30] Foreign Application Priority Data

Feb. 12, 1986 [JP] Japan ................................. 61-28707

[51] Int. Cl.⁴ ......................... B05D 3/12; B05D 1/26; B05D 1/30
[52] U.S. Cl. ...................................... 427/348; 118/62; 118/410; 118/411; 427/358; 427/420; 430/935
[58] Field of Search .......................... 118/410, 411, 62; 427/402, 411, 420, 358, 348; 430/935

[56] References Cited

U.S. PATENT DOCUMENTS

| 4,384,015 | 5/1983 | Koepke et al. | 430/935 X |
| 4,525,392 | 6/1985 | Ishizaki et al. | 427/420 |
| 4,548,837 | 10/1985 | Yoshino et al. | 427/420 X |
| 4,560,590 | 12/1985 | Bok | 427/294 |
| 4,576,109 | 3/1986 | Bok | 427/294 X |

FOREIGN PATENT DOCUMENTS

| 32923 | 5/1973 | Japan. |
| 108566 | 8/1981 | Japan. |
| 20366 | 11/1984 | Japan. |
| 2070459 | 9/1981 | United Kingdom. |

*Primary Examiner*—Michael Lusignan
*Attorney, Agent, or Firm*—Sughrue, Mion, Zinn, Macpeak & Seas

[57] ABSTRACT

A method and apparatus for coating a liquid coating composition to a moving web in which air entrained on the web is replaced by a gas having a higher solubility than air in the liquid coating composition. The moving web is exposed to the gas immediately before it arrives at a die through which the liquid coating composition is applied to the web. A vacuum system may be used to remove the air from the web prior to its exposure to the gas.

13 Claims, 3 Drawing Sheets

METHOD AND APPARATUS FOR COATING

BACKGROUND OF THE INVENTION

1. Field of the Invention

The present invention relates to a method and apparatus for applying various kinds of liquid compositions onto a travelling web in manufacturing photographic film, photographic printing paper, magnetic recording tape, adhesive tape, pressure sensitive recording paper, offset paper, etc.

2. Background of the Invention

In one method of continuous application a liquid composition is caused to flow out of a die through a slit of the die. The most used versions of such a method are a method of multiple coating disclosed in U.S. Pat. No. 2,761,791, a curtain coating method disclosed in U.S. Pat. No. 3,508,947, and an extrusion coating method disclosed in U.S. Pat. No. 3,526,528.

The method according to the present invention is of course applicable to those methods described above, and is further applicable to various combinations thereof, such as extrusion coating method with a slide application, curtain coating method using a die for extrusion coating, etc.

Heretofore, a very important technique has been to manufacture coated products of even quality at an improved coating speed in the photosensitive material manufacturing process, in the process magnetic recording media manufacturing process, etc., in which high coating quality is required.

A problem in such an attempt of improving the coating speed in a high quality coating process is a phenomenon called "air entrainment". This phenomenon is caused such that the air existing on the surface of a travelling web flows to a dynamic contact point of coating at a speed equal to the speed of the travelling web so that the air partially enters between the applied liquid and the web to thereby form residual bubbles. Such bubbles are fatal defects in photosensitive material or magnetic recording media. Accordingly, prevention of occurrence of this phenomenon is one of the important problems to be solved in making the coating speed high.

The air entrainment phenomenon has been investigated not only from the industrial point of view but also from the scientific point of view as developed from the study of dynamic wetting at a liquid-solid junction.

In an article by R. Burley and B. S. Kennedy, entitled "Dynamic Wetting and Air Entrainment at a Liquid-Solid-Gas Junction" (Wetting, Spreading and Adhesion, Chapter 15, edited by J. F. Padday, Academic Press, 1978), it is described that the impinging speed $V_{af}$ (cm/sec) at which air entrainment occurred was measured by impinging a 2.5 cm wide polyester tape into liquid perpendicularly to the liquid surface, and it was found that the impinging speed $V_{af}$ was represented by the equation $$V_{af} = 67.68(\mu g/\rho\sigma) - 0.672$$

where $\mu$, $\sigma$, and $\rho$ represent the liquid viscosity (poise), the liquid surface tension (dyne/cm), and the liquid density (g/cm$^3$), respectively. It is apparent from the equation that the occurrence of air entrainment can be prevented by making the liquid viscosity low. In fact, this method is important also in the industrial point of view. A method for reducing the viscosity of an applied liquid which comes into contact with a web after the liquid is applied to the web is disclosed in U.S. Pat. No. 4,001,024.

However, the method has a disadvantage that dilution of the liquid with a solvent is necessary for any remarkable reduction in the liquid viscosity and therefore excessive drying capacity is correspondingly required.

In another industrial method in which a decompression chamber is provided in a slide coating apparatus, as disclosed in U.S. Pat. No. 3,735,729, the effect of preventing air entrainment is hardly improved even if the degree of pressure reduction is increased beyond a certain value, but destruction of beads occurs owing to the intensive pressure reduction or stripes are produced owing to instability. Accordingly, the method is not satisfactory for keeping quality high with the increase of coating speed.

In a further method of improving the wetting property of a solid surface by attaching liquid steam such as water steam to the web, as disclosed in Japanese Patent Unexamined Publication No. 32923/1973, a relatively long time is required for causing a change in the wetting property. Accordingly, the attachment of steam is not sufficiently effected in such a zone as a decompression chamber of a slide coating apparatus in which the passage time is very short. Furthermore, in the case where condensed dew is attached to the web in the apparatus, fatal dot-like stains are undesirably produced.

As described above, in any conventional method, air entrainment could be prevented to a certain degree but its prevention was not satisfactory.

SUMMARY OF THE INVENTION

An object of the present invention is to provide a method and apparatus for coating in which the conventional defects are eliminated and bubbles are prevented from occuring even at a very high coating speed.

The foregoing object of the invention is attained by a method and apparatus for coating in which coating composition is caused to flow in a single layer of a plurality of layers out of a die through a slit or slits so as to be applied onto a continuously travelling web. According to the invention just before the liquid is applied onto the web, the air entrained with the web is replaced by a gas highly soluble in the liquid.

DETAILED DESCRIPTION OF THE PREFERRED EMBODIMENTS

The present invention will be described more in detail with reference to the drawings.

Figure 1:
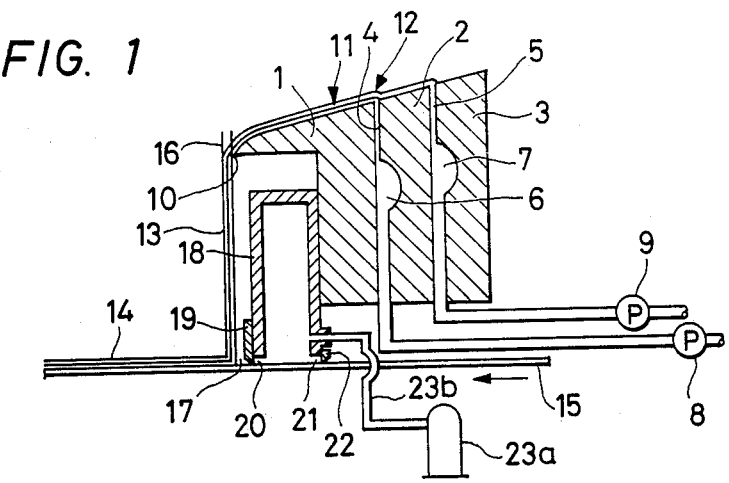
FIGS. 1 to 7 are side views in section illustrating seven embodiments according to the present invention.
Figure 2:
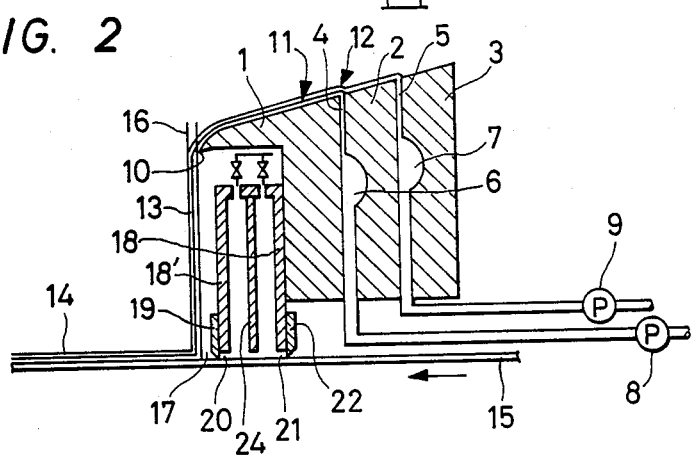

In FIGS. 1 and 2, a block 1 including a lip 10 forms a free falling curtain of liquid coating composition. Blocks 2 and 3 are adjacent to the first block 1. Slits 4 and 5 are formed between adjacent blocks 1, 2 and 3. If coating compositions are applied in three or more layers, more blocks can be suitably added. Cavities 6 and 7 distribute the liquid in the widthwise direction. The cavities 6 and 7 are filled with liquid coating composition fed by pumps 8 and 9 respectively. The respective liquid coating composition in the cavities 6 and 7 falls down the upper surfaces of the blocks 1 and 2 in the form of liquid films 11 and 12 and further falls down vertically in the form of a free falling curtain 13 held by edge guides 16 at its opposite sides. The curtain 13 collides with a web 15 travelling in the direction of the arrow to form a coated layer 14 on the web. In the apparatus described above, a replacement chamber 18 replaces entrained air by a gas highly soluble in the liquid coating composition to be coated. The replacement chamber 18 is disposed in the neighborhood of a dynamic contact point of liquid application. Gaps 20 and 21 act as an entrance to and an exit from the replacement chamber 18. Narrow distances at the gaps 20 and 21 are respectively adjusted by the positions of control plates 19 and 22. A gas is fed from a gas supply source 23a to the replacement chamber 18 via a supply pipe 23b and fills the chamber 18. The chamber 18 has an inside pressure higher than the external air and undergoes leakage through the gaps 20 and 21 to the outside but is adjusted to not make a disturbance in the curtain 13 by the pressure of the gas flowing out of the exit gap 20.

To make such adjustment easy and to reduce the inflow of the entrained air to the replacement chamber 18 owing to the sufficient outflow of the gas from the entrance gap 21 in the direction opposite to the direction of movement of the web, as shown in FIG. 2, a partition plate 24 is preferably provided in the middle of the replacement chamber 18 to separate the chamber into two portions, an upstream and a downstream chamber portion, so as to make the quantity of gas supplied into the chamber portions different from each other.

Figure 3:
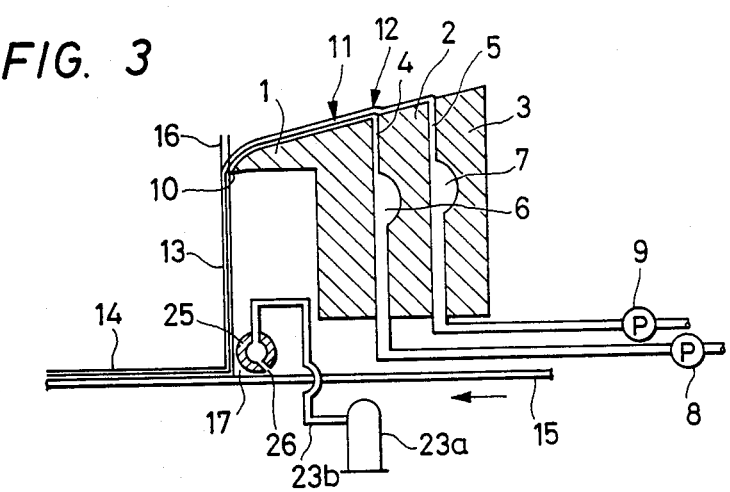

FIG. 3 shows another embodiment of the apparatus according to the invention which is featured in that a distribution chamber 25 acts as entrained-air replacing means and is substituted for the replacement chamber 18 used in FIGS. 1 and 2. A slit 26 is formed in the distribution chamber 25. In this embodiment, the direction of outflow through the slit 26 in the opposite direction to the direction of movement of the web. The fluid speed of the gas is required to be sufficient to collide with the web. In this method, the flow of the gas phase colliding with the web at the dynamic contact point 8 is weak, so that the method has not only an air-entrainment suppressing effect owing to the replacement of the entrained-air by the gas but a synergistic effect of the above-mentioned replacement effect and another air-entrainment suppressing effect owing to the gas-phase shield.

In any of the embodiments of FIGS. 1 to 3, in the method in which a single layer or a plurality layers of liquid 11 and 12 caused to flow out of the die slits 4 and 5 is applied onto the continuously travelling web 15, the air entrained with the web 15 is replaced by a gas highly soluble in the application liquid coating composition at the dynamic contact point just before the liquid coating composition is applied onto the web.

Furthermore, in any apparatus of FIGS. 1 to 3, the entrained-air replacing means 18 or 25 is provided adjacent to both the coating die and the web 15.

Figure 4:
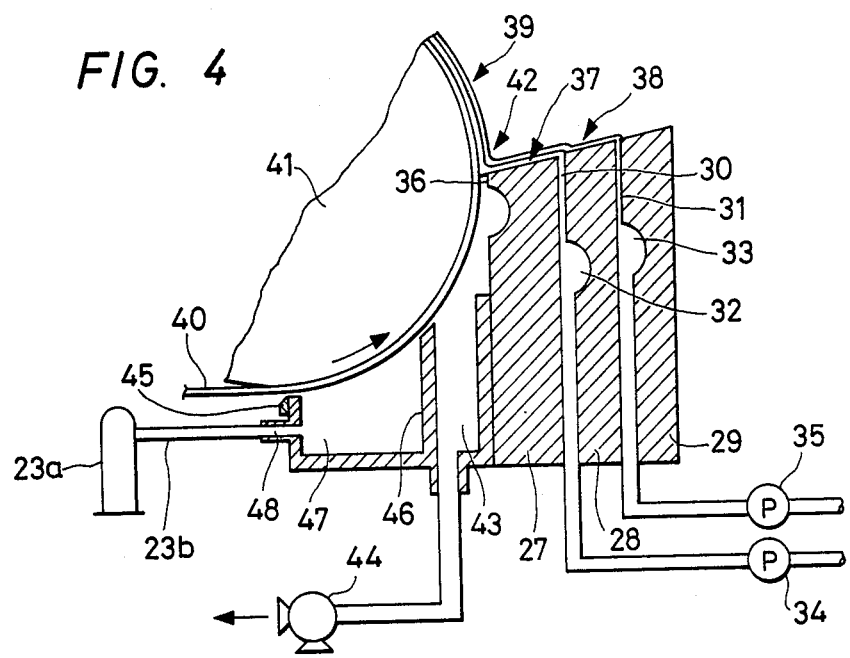

FIG. 4 shows an embodiment of the apparatus in the case where the invention is applied to a slide coating. Slits 30 and 31 are formed between a front block 27 including an edge 36, and rear blocks 28 and 29. If liquid coating composition are applied in three layers or more, the blocks can be suitably increased in number. The liquid coating composition is fed by pumps 34 and 35 to fill cavities 32 and 33 respectively and flows out of the cavities 34 and 35 in the form of liquid films 37 and 38 through respective slits 30 and 31. The liquid in the form of the liquid films 37 and 38 forms beads 42 at an edge 36 between the front block 27 and a continuously travelling web 40 supported by a backing roller 41, resulting in an coated layer 39.

The inside of a decompression chamber 43 generally used is decompressed by a decompressing system 44 to assume a negative pressure compared with the external air.

In this invention, a replacement chamber 47 is provided at an upstream side of the web and is separated from the decompression chamber by a partition 46. The replacement chamber 47 is filled with a gas which is highly soluble in the liquid coating composition and is fed from the gas supply source 23a through a gas supply port 48. Also the decompression chamber 43 is filled with the gas so that the air entrained with the web 40 to the bead portion is replaced by the gas. The volume of the gas flowing out of the replacement chamber 47 in the direction opposite to the direction of movement of the web is adjusted by changing the gap distance by a gap control plate 45 or by changing the flow rate from the supply source.

Figure 5:
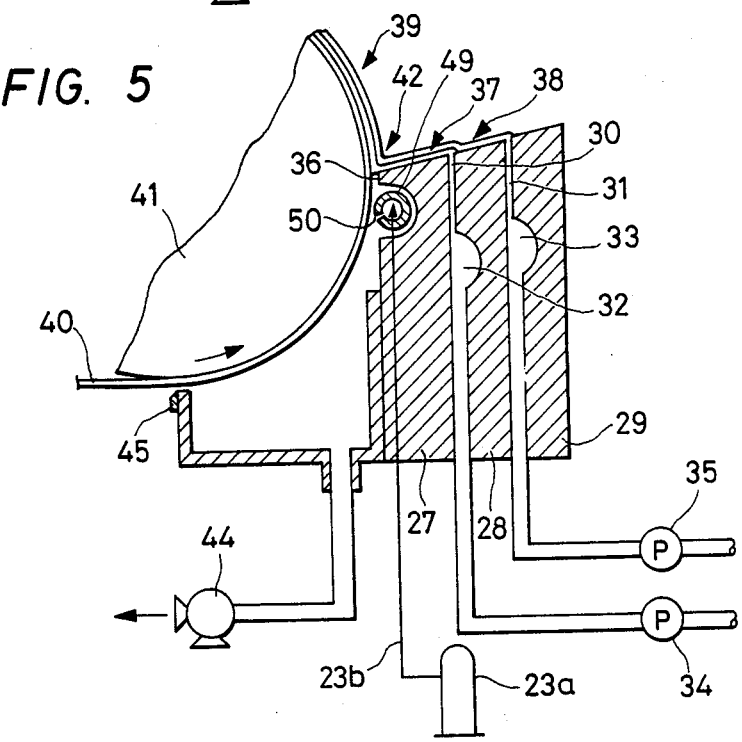

FIG. 5 shows another embodiment of the apparatus according to the invention in which a gas distribution pipe 49 having a blow slit 50 acting as an entrained air replacing means is provided at a portion of the front block 27. The gas highly soluble in the liquid coating composition enters the distribution pipe 49 from the supply source through the gas supply port 48 and uniformly in the width direction blows out of the blow slit 50. The gas blowing direction of the slit 50 is set so that the gas collides with the web 40 in the direction obliquely opposite to the direction of movement of the web 40. The blowing gas is exhausted by the decompressing system. In this case, the gap control plate 45 is used to keep the degree of decompression moderate.

Figure 6:
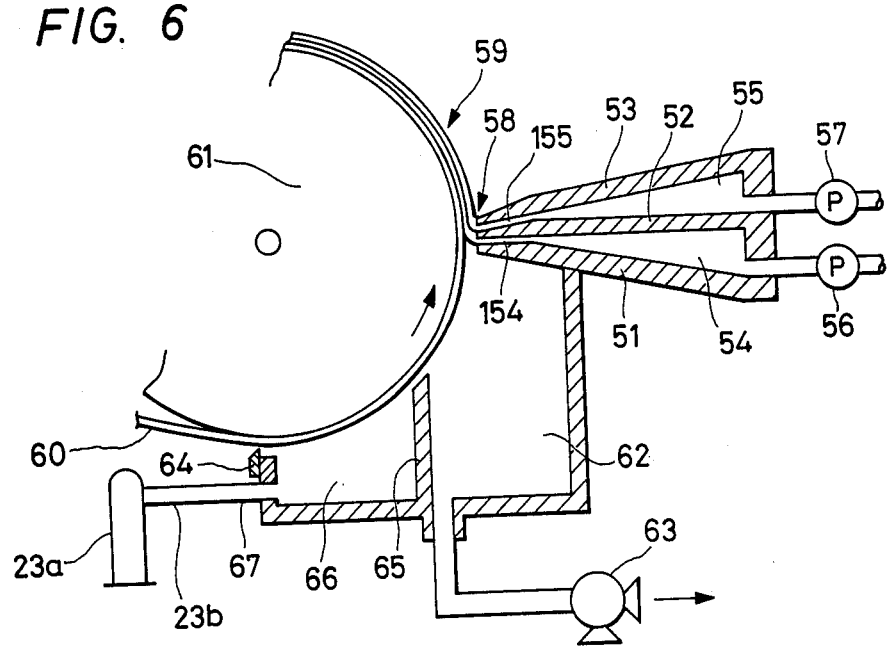

FIG. 6 shows an embodiment in which the invention is applied to an extrusion coating. Blocks 51, 52 and 53 form two slits 154 and 155. The respective liquid coating composition fed by the pumps 56 and 57 fills cavities 54 and 55, passes through the slits 154 and 155, and thus forms extrusion beads 58 between the top end of the respective block and a continuously travelling web 60 supported by a backing roller 61, resulting in an coated layer 59. In this method, if liquid coating compositions are applied in three layers or more, the blocks can be suitably increased in number. A decompression chamber 62 is connected to a decompressing system 63 and can be used in the same manner as described in the case of the slide coating of FIG. 4. By the provision of a replacement chamber 66 separated from the decompression chamber 62 by a partition plate 65 and arranged to be fed with a gas highly soluble in the application liquid from the gas supply source 23a through a gas supply port 67, the invention can be applied to the extrusion coating. The replacement chamber 66 is filled with the gas which is compressed compared with the external air, and the decompression chamber 62 is filled with the gas flowing thereto from the gap between the partition plate 65 and the web.

The flow rate of the gas blowing in the direction opposite to the direction of movement of the web can be adjusted by both a gap control plate 64 and the supply quantity of the gas. Thus, the air entrained with the web is replaced by the gas.

Figure 7:
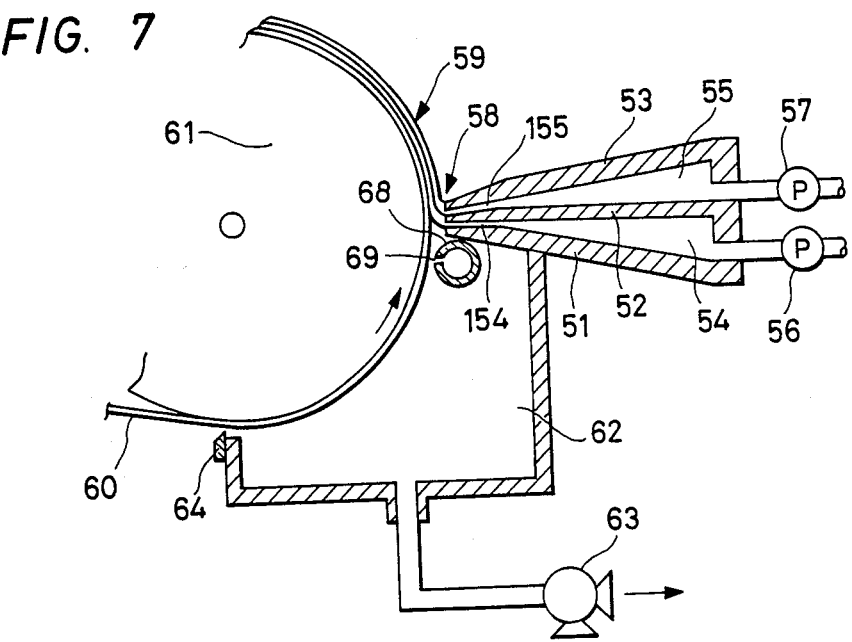

FIG. 7 shows yet another embodiment of the apparatus in which a distribution pipe 68 acting as the entrained-air replacing means is provided within the decompression chamber 62, and in which a gas is caused to blow out of a slit 69 to collide with the web in the direction obliquely opposite to the direction of movement of the web 60. The gas is fed from the gas supply port 67 and is blown out of the distribution pipe 68 uniformly in the width direction toward the web 60 so that the air entrained with the web 60 is replaced by the gas. The blowing gas is exhausted by the decompressing system 63. The gap control plate 64 is used to properly keep the desired degree of pressure reduction in the decompression chamber.

In any apparatus described above, there exists an effect that the air entrained with the surface of the web at the same speed is replaced by a gas highly soluble in the liquid coating composition to be applied.

The concept of the present invention rests on the fact that a solution of gas bubbles readily soluble in liquid is dissolved in the time of one-hundredth second or less compared to the time of several seconds required for the diffusion, absorption and elimination of 10 micrometer diameter air bubbles in a liquid.

The dissolving speed of bubbles is greatly influenced by the difference between the concentration of the gas dissolved in the liquid at the surface contacting with the bubbles and the concentration of the gas dissolved in the liquid at its interior. The solubility of the air in 40° C. pure water is 0.0132 ml/ml $H_2O$ ("Chemical Handbook, Fundamental II", page 621, edited by The Chemical Society of Japan, published by Maruzen Co., Ltd., 1966), while the solubility of carbon dioxide is 0.530 ml/ml $H_2O$ ("Chemical Handbook"). In short, the solubility of carbon dioxide is very high compared to air.

Furthermore, the gas used according to the present invention exists in small to very small quantities in the general air so that the concentration of the gas dissolved in the liquid is approximately zero. Therefore the use of the gas according to the present invention is advantageous in making the difference larger between the gas concentration in the liquid at the surface contacting with the bubbles and the gas concentration inside the liquid. This large concentration difference increases the dissolving speed of bubbles, compared with air the concentration of which is not zero in the liquid. If such a gas having solubility higher than the air is entrained in place of the air, the bubbles instantly disappear because of the high dissolving speed of the bubbles. Accordingly, the occurrence of defects owing to the residual bubbles can be remarkably suppressed.

Furthermore, the gas used herein has a sufficiently low boiling point. Accordingly, there is no possibility that the gas comes in contact with parts where the temperature is not maintained constant in the vicinity of the application machine to produce dew condensation at the low temperature part to thereby make the support or the surface of applied film dirty and wet. The liquid coating composition used according to the present invention may be of a water-soluble group or may be of an organic solvent group as long as it is a liquid compositions. Examples of liquid coating composition for photosensitive material include liquid coating compositions for such as a photosensitive emulsion layer, an undercoat layer, a protective layer, a back layer, an antihalation layer, etc.

The solvent of the binder used herein may be a mixture of water and aqueous organic solvent. Alternative examples of the liquid coating composition for magnetic recording media include liquid coating compositions for such as magnetic layer, an undercoat layer, a back layer, etc.

In the application according to the invention, the number of coating layers is not limited. That is, the coating method may be composed of a single or plurality of layers. In the case of a plurality of layers, all the layers may not have the same function and the same composition but various kinds of layers can be used in combination.

The gas used according to the present invention is basically determined in accordance with the composition of the coating liquid used. If the coating liquid is of a water-soluble group, it is necessary to use a gas, such as chlorine, sulfur dioxide, hydrogen sulfide, hydrogen halide, ammonia, acetylene, carbon dioxide or the like, having sufficiently higher solubility in the liquid coating composition than nitrogen and air. In practice, the gas is selected from these materials under the primary condition that the gas does not injure the performance of the liquid which is the original object of the liquid. From this point of view, it is preferable that a low reactive gas, such as carbon dioxide, is used for the liquid coating composition, such as photosensitive material, whose original performance is considerably injured by an unnecessary redox reaction. Examples of the combination of liquid and gas include combinations, such as a combination of sodium hydroxide aqueous solution and carbon dioxide, in which the absorption speed of the gas in the liquid increases owing to chemical absorption instead of physical absorption.

Also in the case where the liquid coating composition mainly contains an organic solvent it is necessary that the gas has a sufficiently higher solubility in the liquid coating composition than nitrogen and air. For example, carbon dioxide is used in combination with a solution mainly containing a solvent, such as acetone, ethanol, carbon tetrachloride, benzene, or methanol. The combination is not limited to this example as long as the solubility of the gas in the liquid coating composition used is higher than that of the air and nitrogen.

Examples of the web used according to the present invention include paper, plastic film, resin coated paper, synthetic paper, metal, etc. Examples of the plastic film used include polyolefins, such as polyethylene and polypropylene vinyl copolymers, such as polyvinyl acetate, polyvinyl chloride and polystyrene, polyamides, such as 6,6-Nylon and 6-Nylon, polyesters, such as polyethylene terephthalate and polyethylene-2.6-naphtalate, cellulose acetates, such as polycarbonate, cellulose triacetate and cellulose diacetate. Typical examples of resin material used in the resin coated paper include polyolefins, but the material is not limited thereto. An example of the the metal web is an aluminum belt-like matter.

To make the effect of the invention more clear, an example according to the invention will be described hereunder.

As liquid coating composition used was an aqueous solution of 17.5% photographic alkali-processed gelatin, including 0.15% by weight of an anion-group surface active agent and a very small amount of a water-soluble dye added thereto to make the detection of bubbles easy.

The viscosity of the liquid was 1.22 poise at 40° C. A single layer of the liquid coating composition was applied to a gelatin-undercoated cellulose triacetate web horizontally travelling at a position 10 cm lower than the top end of the apparatus as shown in FIG. 1 with the flow rate per width of 0.74 cc/cm-sec.

In the case where the replacement chamber 18 was not supplied with a gas and the suction side thereof was open, a limit coating speed was 65 m per minute. The terms "limit coating speed" used herein means the upper limit of the coating speed under which the occurrence of bubbles owing to the involvement of the entrained air is not an obstacle. Carbon dioxide was supplied as a replacement gas with the flow rate per width of 50 cc/cm-sec, whereafter the limit coating speed unexpectedly increased to 200 m per minute in spite of the same flow rate of the liquid coating composition. Thus, a sample having a satisfactory surface without residual bubbles at a speed lower than the limit coating speed, was obtained.

According to the present invention, the air entrained with the web is replaced by a gas highly soluble in the liquid coating composition just before the liquid is applied onto the web. Accordingly, coating difficulties owing to the involvement of the entrained air can be prevented from occurring as described above. Accordingly, the coating speed can be raised. Thus, the increase of drying load owing to the dilution of the liquid and the deterioration of quality owing to dew condensation can be prevented.

What is claimed is:

1. A coating method, comprising the steps of:
   moving a web over a slit of a die from a first side of said die;
   flowing a liquid coating composition through said slit onto said moving web to form a layer on a first surface of said web; and
   exposing said first surface of said web proximate to said first side of said die to a gas substantially more soluble in said liquid coating composition than air to displace air in contact with said first surface of said moving web upstream of said die slit such that the gas having higher solubility than that of air instantly dissolves in the liquid when entrained to thereby prevent residual bubbles in said coating composition.

2. A coating method as recited in claim 1, wherein said exposing step exposes said first surface of said web in a restricted area.

3. A coating method as recited in claim 1, wherein said gas substantially comprises carbon dioxide.

4. A coating method as recited in claim 2, wherein said liquid coating composition contains a gelatin aqueous solution.

5. A coating method as recited in claim 3, wherein said liquid coating composition contains a gelatin aqueous solution.

6. A coating method as recited in claim 2, wherein said liquid coating composition substantially consists of an organic solvent.

7. A coating method as recited in claim 3, wherein said liquid coating composition substantially consists of an organic solvent.

8. A coating method, comprising the steps of:
   moving a web over a slit of a die from a first side of said die;
   flowing a liquid coating composition through slit onto said moving web to form a layer on a first surface of said web; and
   exposing said first surface of said web on said first side of said die to a gas substantially more soluble in said liquid coating composition than air via a replacement chamber immediately before said liquid is applied onto said web so that occurrence of minute bubbles is prevented.

9. A coating method as recited in claim 8, wherein said gas substantially comprises carbon dioxide.

10. A coating method as recited in claim 8, wherein said liquid coating composition contains a gelatin aqueous solution.

11. A coating method as recited in claim 9, wherein said liquid coating composition contains a gelatin aqueous solution.

12. A coating method as recited in claim 8, wherein said liquid coating composition substantially consists of an organic solvent.

13. A coating method as recited in claim 9, wherein said liquid coating composition substantially consists of an organic solvent.

* * * * *